United States Patent [19]
Smetz

[11] Patent Number: 5,601,326
[45] Date of Patent: Feb. 11, 1997

[54] LOAD-LIFTING DEVICE OR LASHING DEVICE

[75] Inventor: Reinhard G. E. Smetz, Baldingen, Germany

[73] Assignee: RUD-Kettenfabrik Rieger & Dietz GmbH. u. Co., Aalen-Unterkochen, Germany

[21] Appl. No.: 432,287

[22] Filed: May 1, 1995

[30] Foreign Application Priority Data

May 11, 1994 [DE] Germany ............................ 9407926 U

[51] Int. Cl.⁶ ...................................................... B66C 1/40
[52] U.S. Cl. ............................... 294/82.1; 294/74; 59/93; 116/200; 116/212
[58] Field of Search ...................... 294/1.1, 82.1, 294/74; 116/200, 212, DIG. 1, DIG. 41; 40/316, 625; 59/35.1, 78, 84, 85, 93

[56] References Cited

U.S. PATENT DOCUMENTS

| | | | |
|---|---|---|---|
| 4,094,141 | 6/1978 | Rehbein | 294/82.1 |
| 4,102,295 | 7/1978 | Crook, Jr. et al. | 294/82.1 |
| 4,671,916 | 6/1987 | Hamas | 40/913 |
| 4,841,653 | 6/1989 | Negley | 40/625 |
| 5,103,755 | 4/1992 | Garrett | 294/82.1 |

FOREIGN PATENT DOCUMENTS 2611-228  9/1977  Germany ............................ 294/82.1

*Primary Examiner*—Dean Kramer
*Attorney, Agent, or Firm*—Mark P. Stone

[57] ABSTRACT

In order to insure quick and reliable load acceptance and lifting allocation of a specific class when assembling load-lifting devices or lashing devices, all the parts belonging to a corresponding device are provided with a coating which is assigned in each case to a specific class and which contains an indicator color.

5 Claims, 1 Drawing Sheet

LOAD-LIFTING DEVICE OR LASHING DEVICE

BACKGROUND OF THE INVENTION

The invention relates to a load-lifting device or lashing device, in particular a sling chain, with in each case at least one load accepting means and one lifting means. The load accepting means and lifting means of load-lifting devices must be labelled in accordance with the regulations set down by the professional authorities. This is done, in practice, by stamping various types of data on certain parts of the load accepting means, and by providing the lifting means permanently with identification tags which carry information concerning the class and the load-bearing capacity. The facts outlined above largely ensure that, when assembling a single leg sling for example, suspension members, chain-shortening members and hooks of the same class are combined with one another. Experience has shown that problems occur, in practice, when accepting and lifting means of different classes are kept in stock in one and the same works, since in such cases special care is necessary when assembling the parts which are to be combined.

SUMMARY OF THE INVENTION

The invention is based on the object of making it easier to assemble load-lifting devices or lashing devices by means of simplified pre-selection of each of the parts which are to be combined. According to the invention, this object is achieved, in a load-lifting device or lashing device of the type in question, by virtue of the fact that all the parts belonging to the device are provided with a coating which shows that the parts are of the same class, and which contains an indicator color.

The load-lifting device or lashing device according to the invention has the advantage that the user who is assembling it can recognize at a glance which parts belong to one and the same class, so that he simply has to ensure the correct allocation of these parts within the respective class which is made apparent to him by the indicator color. The bright indicator color of the coating also means that when the device is being used in poor lighting conditions, for example underground, relocating the device in its entirety, or relocating individual parts thereof, in particular replacement parts, is made easier by means of the reflection effect of the indicator color. Finally, the indicator color also proves favorable insofar as it acts as a hazard indicator.

BRIEF DESCRIPTION OF THE DRAWINGS

The invention is explained in greater detail herinbelow with reference to he load-lifting device represented in the attached drawing, in which.

DESCRIPTION OF THE BEST MODES FOR CARRYING OUT THE INVENTION

Figures 1, 2, 3:
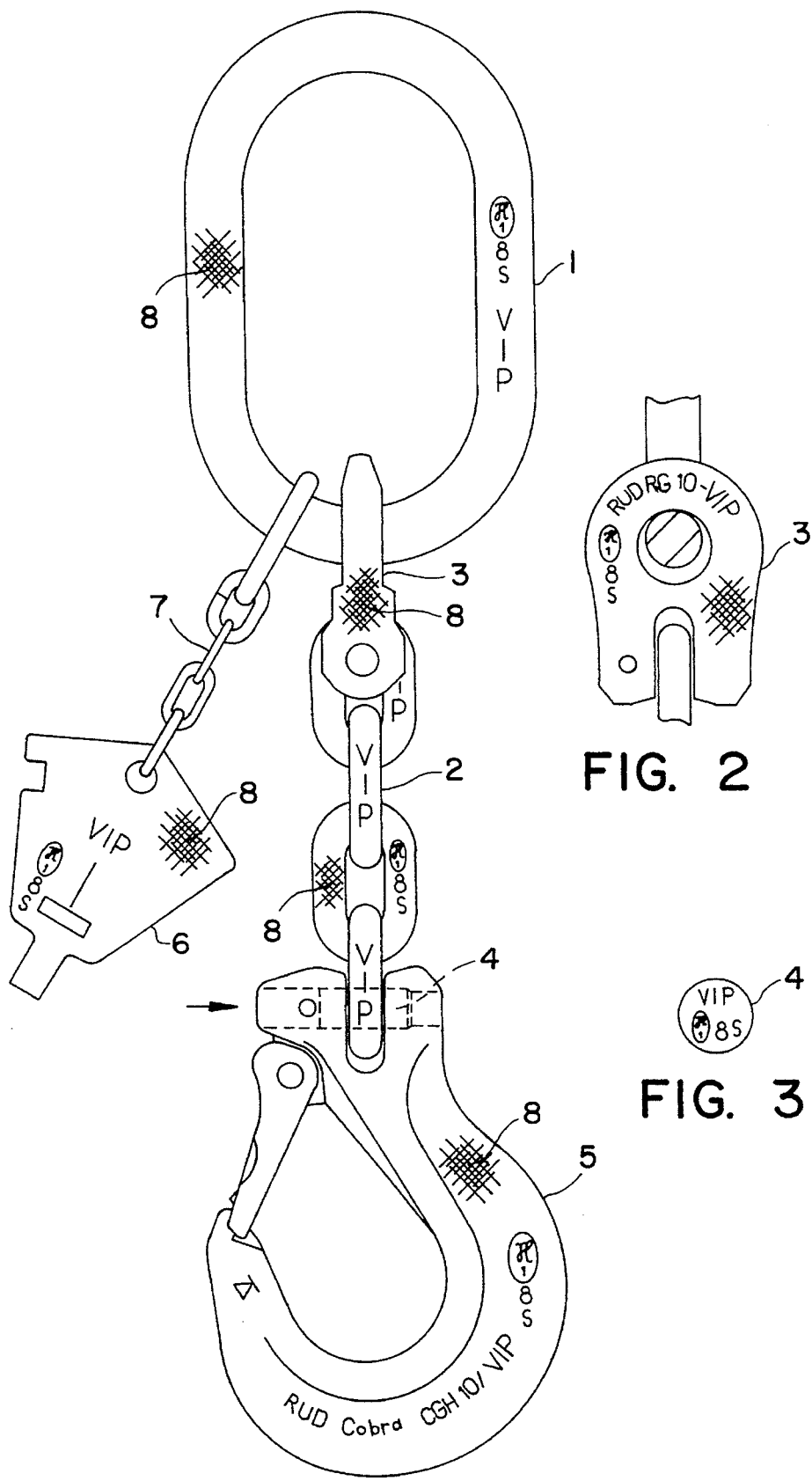
FIG. 1 shows the side view of a load lifting device in the form of a single leg sling.
FIG. 2 shows the side view of a part of the sling and FIG. 3 shows the front view of an individual part of the sling.

The single leg sling respresented in FIG. 1 consists of a suspension member 1, a ring fork 3 connecting the suspension member to one end of a chain strand 2, and a hook 5 secured on the other end of the chain strand 2 with the aid of a bolt 4. In this case the hook 5 is forming the load accepting means while the chain strand 2, the ring fork 3 and the suspension member 1 are forming the lifting means. The sling is additionally provided with an identification tag 6 which is connected permanently to the suspension member 1 via a short chain strand section 7. All the abovementioned parts are provided, on those outer surfaces which are visible in the assembled state of the sling, with a bright coating, which is indicated in the drawing by a crosshatched area 8 in each case, and which identifies them as belonging to one class. A pink coloration of the coating has proven particularly advantageous because this is strongly reflecting and is conspicious. By adding fluorescent components to the respective indicator color, the conspicuousness of the coating can be further enhanced.

As can be seen from the drawing, all the bearing parts 1 to 5 and the identification tag 6 are additionally stamped, in a corresponding manner, with all the important details, such as size and manufacturer, so that not only the pre-selection or rough selection of the class, as simplified by the indicator color of the coating, but also the correct allocation of parts within a class is made appreciably easier.

I claim:

1. A load-lifting device or lashing device, said device comprising a plurality of parts including at least one lead transfer means formed by a chain strand, at least one lead accepting means attached to one end of said load transfer means, and at least one lifting means attached to another end of said load transfer means, wherein each of said plurality of parts is provided with a coating (8) which shows that the parts are of the same class, and which contains an indicator color.

2. The load-lifting device or lashing device as claimed in claim 1, wherein the color component of the coating (8) is fluorescent.

3. The load-lifting device or lashing device as claimed in claim 2, wherein the coating (8) is colored pink.

4. The load-lifting device or lashing device as claimed in claim 1, wherein the coating (8) is colored pink.

5. A load-lifting device or lashing device as claimed in claim 1, wherein said device comprises a sling chain.

* * * * *

UNITED STATES PATENT AND TRADEMARK OFFICE
CERTIFICATE OF CORRECTION

PATENT NO. : 5,601,326
DATED      : February 11, 1997
INVENTOR(S) : Reinhard G.E. Smetz It is certified that error appears in the above-identified patent and that said Letters Patent is hereby corrected as shown below:

Claim 1, line 2: Delete "lead", and substitute - -load- -.

Claim 1, line 3: Delete "lead", and substitute - -load- -.

Signed and Sealed this

Twenty-second Day of April, 1997

Attest:

BRUCE LEHMAN

*Commissioner of Patents and Trademarks*

*Attesting Officer*